United States Patent
Kato et al.

(10) Patent No.: US 10,867,225 B2
(45) Date of Patent: Dec. 15, 2020

(54) MEASUREMENT SYSTEM AND MEASUREMENT METHOD

(71) Applicant: OMRON Corporation, Kyoto (JP)

(72) Inventors: Yutaka Kato, Kyotanabe (JP); Toyoo Iida, Nagaokakyo (JP); Hitoshi Nakatsuka, Hyogo (JP)

(73) Assignee: OMRON Corporation, Kyoto (JP)

(*) Notice: Subject to any disclaimer, the term of this patent is extended or adjusted under 35 U.S.C. 154(b) by 25 days.

(21) Appl. No.: 16/529,791

(22) Filed: Aug. 2, 2019

(65) Prior Publication Data

US 2020/0042847 A1 Feb. 6, 2020

(30) Foreign Application Priority Data

Aug. 2, 2018 (JP) .................................. 2018-145790
Jul. 31, 2019 (JP) .................................. 2019-141535

(51) Int. Cl.
| | |
|---|---|
| *G06K 19/06* | (2006.01) |
| *G06F 16/532* | (2019.01) |
| *G06T 7/73* | (2017.01) |
| *G06T 7/521* | (2017.01) |
| *G06F 16/583* | (2019.01) |

(52) U.S. Cl.
CPC ..... *G06K 19/06037* (2013.01); *G06F 16/532* (2019.01); *G06F 16/5854* (2019.01); *G06T 7/521* (2017.01); *G06T 7/73* (2017.01)

(58) Field of Classification Search
CPC ......... G06K 19/00; G06K 19/04; G06K 19/06
USPC ........................................ 235/494, 487, 375
See application file for complete search history.

(56) References Cited

U.S. PATENT DOCUMENTS

| | | | |
|---|---|---|---|
| 2014/0164352 A1* | 6/2014 | Denninghoff | H03H 9/25 707/711 |
| 2014/0164885 A1* | 6/2014 | Kajitani | G04R 20/06 714/800 |

FOREIGN PATENT DOCUMENTS

JP 2012079294 4/2012

* cited by examiner

*Primary Examiner* — Edwyn Labaze
(74) *Attorney, Agent, or Firm* — JCIPRNET

(57) ABSTRACT

A measurement system includes a first search part and a second search part. The first search part searches a set of codes for a corresponding region that indicates the same sequence as a model code string composed of a predetermined number of codes included in a unit region set in a projection pattern. The second search part searches the set of codes for a code that matches each code included in a model code string that fails in the search for the corresponding region among the model code strings included in the projection pattern, and then determines recognition of the model code string when the number of the codes that fail to be searched in this search is equal to or smaller than a predetermined number.

16 Claims, 12 Drawing Sheets

MEASUREMENT SYSTEM AND MEASUREMENT METHOD

CROSS-REFERENCE TO RELATED APPLICATION

This application claims the priority benefit of Japan application serial no. 2018-145790, filed on Aug. 2, 2018 and Japan application serial no. 2019-141535, filed on Jul. 31, 2019. The entirety of the above-mentioned patent applications is hereby incorporated by reference herein and made a part of this specification.

BACKGROUND

Technical Field

The disclosure relates to a measurement system and a measurement method for measuring the position of an object based on an image acquired by imaging the object while irradiating the object with a predetermined projection pattern.

Description of Related Art

There are conventional techniques for measuring the three-dimensional shape of an object using an optical method. For example, Japanese Laid-Open No. 2012-079294 (Patent Document 1) discloses an image information processing device that projects a projection pattern to a subject and uses the image acquired by imaging the subject projected with the projection pattern to perform three-dimensional measurement for the subject, wherein the projection pattern includes two-dimensional point strings obtained by assigning, as symbols, points having different colors or luminances for different types of codes to the respective codes of a projection code string in which several types of codes are arranged in two dimensions.

RELATED ART

Patent Document

[Patent Document 1] Japanese Laid-Open No. 2012-079294

In the method disclosed in Patent Document 1 described above, information code strings are restored by performing code error detection using a predetermined number of information code strings. However, if the predetermined number of information code strings cannot be obtained, there is a possibility that the target information code strings cannot be restored. That is, the information code strings cannot be restored only by peripheral search, and a defective portion that cannot be measured may occur.

The disclosure provides a solution for increasing the robustness of measurement in a configuration that measures the position of an object based on an image acquired by imaging the object while irradiating the object with a predetermined projection pattern.

SUMMARY

A measurement system according to an embodiment of the disclosure includes an acquisition part acquiring an input image that is an image acquired by imaging an object while irradiating the object with a projection pattern determined in advance, wherein the projection pattern includes a plurality of types of reference patterns, each of which is assigned with a unique code, arranged according to a predetermined rule. The measurement system includes: a detection part acquiring a position to which each reference pattern is irradiated and a set of codes indicated by the irradiated reference pattern by searching each reference pattern included in the irradiated projection pattern in the input image; a first search part searching the set of codes for a corresponding region that indicates the same sequence as a model code string composed of a predetermined number of codes included in a unit region set in the projection pattern; a second search part searching the set of codes for a code that matches each code included in a model code string, which fails in the search for the corresponding region among the model code strings included in the projection pattern, and then determining a recognition of the model code string when the number of the codes that fail to be searched in this search is equal to or smaller than a predetermined number; and a distance calculation part calculating a distance from an irradiation reference plane of the projection pattern to each part of the object based on a corresponding relationship between the model code string and the corresponding region searched by the first search part and the second search part.

According to the disclosure, since the corresponding relationship between the model code and the corresponding region is determined strictly, and then the corresponding region with respect to the model code, for which the corresponding relationship cannot be determined, is searched for under a relaxed condition that allows mismatch of a predetermined number of codes, it is possible to properly calculate the distance to the object even if the input image includes noise for some reason.

The first search part and the second search part may search along an epipolar line of the input image. Searching along the epipolar line can realize efficient searching.

The second search part may repeat a search process for all model code strings that fail in the search for the corresponding region. By repeating the search process, the distance from the irradiation reference plane of the projection pattern to each part of the object can be calculated more reliably.

The second search part may repeat searching for a code that matches each code included in the model code string that fails in the search for the corresponding region by varying the predetermined number. By varying the predetermined number, it is possible to prevent an erroneous search as well as more reliably calculate the distance to each part of the object.

A measurement method according to another embodiment of the disclosure includes acquiring an input image that is an image acquired by imaging an object while irradiating the object with a projection pattern determined in advance, wherein the projection pattern includes a plurality of types of reference patterns, each of which is assigned with a unique code, arranged according to a predetermined rule. The measurement method includes: acquiring a position to which each reference pattern is irradiated and a set of codes indicated by the irradiated reference pattern by searching each reference pattern included in the irradiated projection pattern in the input image; searching the set of codes for a corresponding region that indicates the same sequence as a model code string composed of a predetermined number of codes included in a unit region set in the projection pattern; and searching the set of codes for a code that matches each code included in a model code string, which fails in the search for the corresponding region among the model code strings included in the projection pattern, and then determining a recognition of the model code string when the number of the codes that fail to be searched in this search is equal to or smaller than a predetermined number.

According to the disclosure, since the corresponding relationship between the model code and the corresponding region is determined strictly, and then the corresponding region with respect to the model code, for which the corresponding relationship cannot be determined, is searched for under a relaxed condition that allows mismatch of a predetermined number of codes, it is possible to properly calculate the distance to the object even if the input image includes noise for some reason.

The reference pattern may be searched along an epipolar line of the input image. Searching along the epipolar line can realize efficient searching.

A search process may be repeated for all model code strings that fail in the search for the corresponding region. By repeating the search process, the distance from the irradiation reference plane of the projection pattern to each part of the object can be calculated more reliably.

The measurement method may further include repeating searching for a code that matches each code included in the model code string that fails in the search for the corresponding region by varying the predetermined number. By varying the predetermined number, it is possible to prevent an erroneous search as well as more reliably calculate the distance to each part of the object.

According to the disclosure, it is possible to increase the robustness of measurement in a configuration that measures the position of the object based on the image acquired by imaging the object while irradiating the object with the predetermined projection pattern.

BRIEF DESCRIPTION OF THE DRAWINGS

FIG. 11(A) and FIG. 11 (B) are diagrams showing an example of the projection pattern used in the measurement system according to the present embodiment.

DESCRIPTION OF THE EMBODIMENTS

Figure 1:
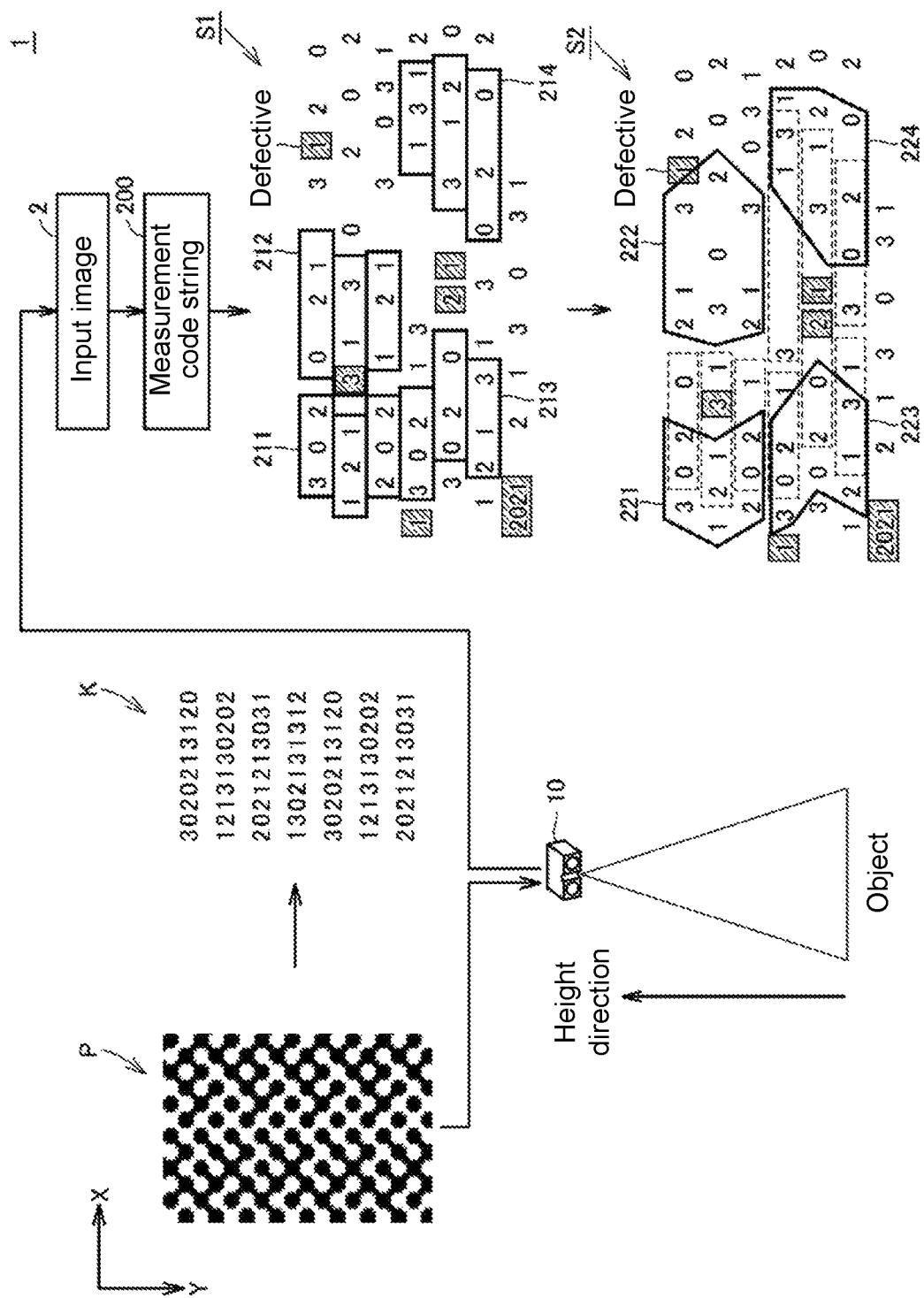
FIG. 1 is a schematic diagram showing an application example of the measurement system according to the present embodiment.

The embodiments of the disclosure will be described in detail with reference to the drawings. The same or corresponding parts in the drawings will be denoted by the same reference numerals and thus descriptions thereof will not be repeated.

A. Application Example

First, an example of the situation where the disclosure is applied will be described.

FIG. 1 is a schematic diagram showing an application example of a measurement system 1 according to the present embodiment. Referring to FIG. 1, the measurement system 1 according to the present embodiment includes a measurement head 10.

An input image 2 is acquired, which is an image acquired by imaging an object with the measurement head 10 while irradiating the object with a predetermined projection pattern P from the measurement head 10. Typically, a projection pattern P that follows structured lighting is used. That is, in the projection pattern P that is used, multiple types of reference patterns respectively assigned with unique codes are arranged according to a predetermined rule. Each reference pattern included in the projection pattern P is also referred to as a "primitive".

The type of each reference pattern included in the projection pattern P can be expressed using numerical values. A change of such an expression is also referred to as coding. In the example shown in FIG. 1, an equivalent matrix K can be generated by coding the projection pattern P.

An image measurement device that constitutes the measurement system 1 performs a three-dimensional measurement process using the information of the projection pattern P and a gradation pattern corresponding to the projection pattern P shown in the input image 2.

The image measurement device acquires the position to which each primitive is irradiated and a measurement code string 200, which is a set of codes indicated by the irradiated primitive by searching the input image 2 for each primitive included in the irradiated projection pattern P.

The image measurement device searches the measurement code string 200 for a corresponding region (hereinafter also referred to as "grid code pattern") which indicates the same sequence as a model code string composed of a predetermined number of codes included in a unit region (hereinafter also referred to as "word") set in the projection pattern P (Step S1). In the example shown in FIG. 1, recognition of the grid code patterns 211, 212, 213, and 214 can be determined with respect to the measurement code string 200.

However, in the measurement code string 200, a part of the primitives that constitute the word cannot be searched, and a defective portion where the word cannot be reconstructed may exist.

Therefore, the image measurement device searches the measurement code string 200 for a code that matches each code included in a model code string, which fails in the search for the word (corresponding region) among the model code strings included in the projection pattern P, and then determines a recognition of the model code string when the number of codes that fail to be searched in this search is equal to or smaller than a predetermined number (Step S2).

In the example shown in FIG. 1, for the measurement code string 200, with respect to the regions respectively enclosed by the grid code patterns 221, 222, 223, and 224, all the primitives can be associated with the model words except for the three defective primitives.

Finally, the image measurement device calculates the distance from the irradiation reference plane of the projection pattern P to each part of the object based on the corresponding relationship between the model code string and the word searched in Step S1 and Step S2. A set of the calculated distances can be expressed as a three-dimensional measurement result image.

Since the image measurement system according to the present embodiment strictly determines the corresponding relationship between the model code and the corresponding region and then searches the corresponding region with respect to the model code, for which the corresponding relationship cannot be determined, under a relaxed condition that allows mismatch of a predetermined number of codes, it can properly calculate the distance to the object even if the input image includes noise for some reason.

B. Device Configuration

Next, an example of the device configuration that constitutes the measurement system 1 according to the present embodiment will be described.

b1: Measurement Head 10

Figure 2:
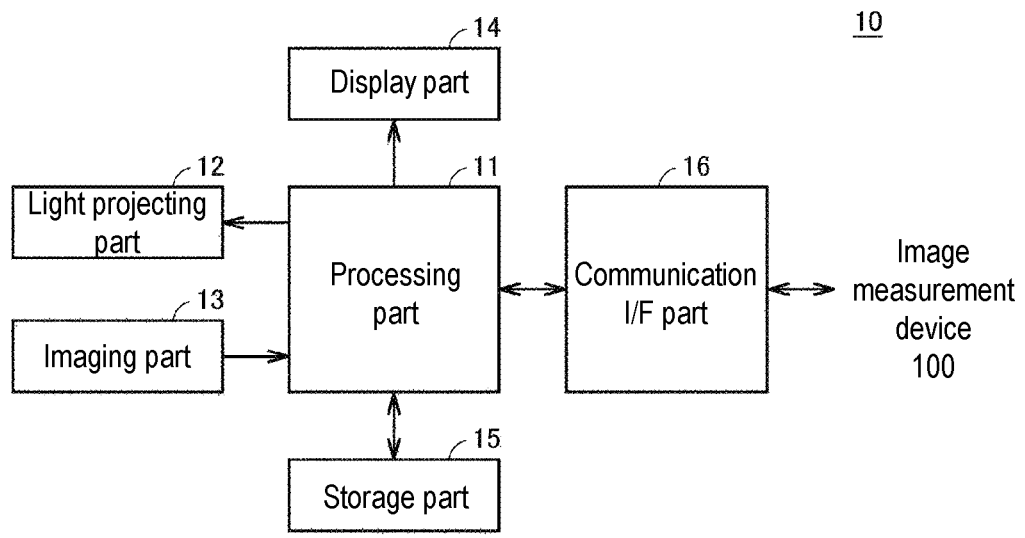
FIG. 2 is a schematic diagram showing a configuration example of the measurement head that constitutes the measurement system according to the present embodiment.

FIG. 2 is a schematic diagram showing a configuration example of the measurement head 10 that constitutes the measurement system 1 according to the present embodiment. Referring to FIG. 2, the measurement head 10 includes a processing part 11, a light projecting part 12, an imaging part 13, a display part 14, and a storage part 15.

The processing part 11 is responsible for the entire processing of the measurement head 10. The processing part 11 typically includes a processor, a storage for storing instruction codes to be executed by the processor, and a memory for expanding the instruction codes. In this case, in the processing part 11, the processor expands the instruction codes on the memory for execution to realize various processes. All or a part of the processing part 11 may be implemented using a dedicated hardware circuit (for example, an ASIC (application specific integrated circuit) or an FPGA (field-programmable gate array)).

The display part 14 notifies the outside of various types of information acquired or calculated in the measurement head 10.

The storage part 15 stores the image acquired by the imaging part 13 and preset calibration parameters.

A communication interface (I/F) part 16 is in charge of exchanging data between the measurement head 10 and the image measurement device 100.

b2: Image Measurement Device 100

Figure 3:
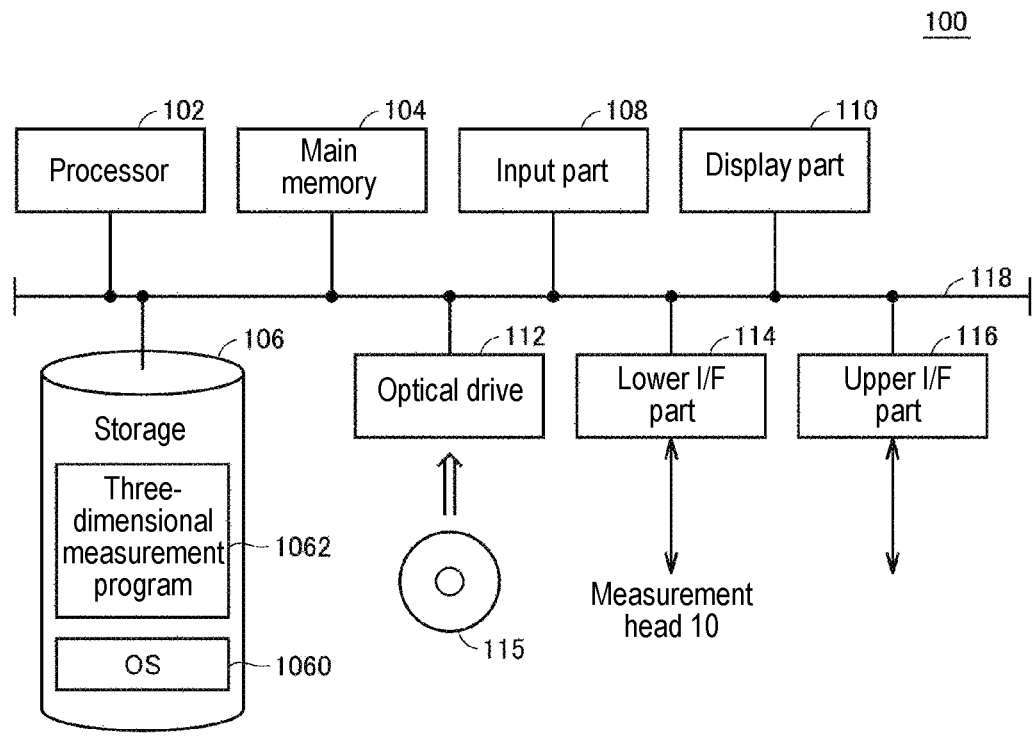
FIG. 3 is a schematic diagram showing a configuration example of the image measurement device included in the measurement system according to the present embodiment.

FIG. 3 is a schematic diagram showing a configuration example of the image measurement device 100 included in the measurement system 1 according to the present embodiment. The image measurement device 100 is typically implemented using a general-purpose computer. Referring to FIG. 3, the image measurement device 100 includes a processor 102, a main memory 104, a storage 106, an input part 108, a display part 110, an optical drive 112, a lower interface part 114, and an upper interface part 116. These components are connected via a processor bus 118.

The processor 102 is configured by a CPU (central processing unit), a GPU (graphics processing unit), or the like, and reads the programs (an OS 1060 and a three-dimensional measurement program 1062 as an example) stored in the storage 106 and develops the programs in the main memory 104 for execution to realize various processes as described later.

The main memory 104 is configured by a volatile storage device such as a DRAM (dynamic random access memory) or a SRAM (static random access memory). The storage 106 is configured by, for example, a non-volatile storage device such as a HDD (hard disk drive) or a SSD (solid state drive).

The storage 106 stores the three-dimensional measurement program 1062 that is for providing the function as the image measurement device 100 in addition to the OS 1060 that is for realizing the basic functions.

The input part 108 is configured by a keyboard, a mouse, or the like and accepts user operations. The display part 110 is configured by a display, various indicators, a printer, or the like and outputs a processing result or the like from the processor 102.

The lower interface part 114 is in charge of exchanging data with the measurement head 10. The upper interface part 116 is in charge of exchanging data with a higher-level device (for example, PLC (programmable computer)) not shown.

The image measurement device 100 has the optical drive 112, and from a recording medium 115 (for example, an optical recording medium such as a DVD (digital versatile disc)) that non-transiently stores computer readable programs, the programs stored therein are read and installed in the storage 106, etc.

The three-dimensional measurement program 1062, etc. to be executed by the image measurement device 100 may be installed via the computer readable recording medium 115, but it may also be downloaded from a server device or the like on a network to be installed. In addition, the function provided by the three-dimensional measurement program 1062 according to the present embodiment may be realized using a part of the modules provided by the OS.

Although FIG. 3 shows a configuration example that the processor 102 executes the programs to provide the necessary functions as the image measurement device 100, all or a part of the provided functions may be implemented using a dedicated hardware circuit (for example, an ASIC or an FPGA).

C. Three-Dimensional Measurement

Next, the three-dimensional measurement performed by the measurement system 1 according to the present embodiment will be described. In the present embodiment, the three-dimensional measurement is realized using a method called structured lighting. The structured lighting method relates to a measurement system that irradiates an object with a predetermined projection pattern and measures the position of the object (the distance from a light projecting part or a light receiving part) based on an image (hereinafter also referred to as "input image") acquired by imaging the object while irradiating the object with the projection pattern. That is, the shape of the object is measured.

In the present embodiment, a method of emitting a measurement light having the predetermined projection pattern (typically, a gradation pattern) is used as an example of structured lighting.

The measurement system 1 according to the present embodiment has the imaging part 13 corresponding to an acquisition part that acquires an input image which is an image acquired by imaging the object while irradiating the object with the predetermined projection pattern from the light projecting part 12. In the following description, the irradiation surface of the light projecting part 12 is regarded as the "irradiation reference plane" of the projection pattern P.

In the measurement system 1, calibration is performed between the light projecting part 12 and the imaging part 13 included in the measurement head 10, and the optical parameters of the light projecting part 12 and the imaging part 13 and the matrix associating them are determined in advance. If the optical parameters of the light projecting part 12 and the imaging part 13 are both determined based on the same reference point and the height of the projection plane of the light projecting part 12 is specified, it is possible to calculate to which pixel on the light receiving surface of the imaging part 13 the projection pattern projected from the light projecting part 12 corresponds.

The projection pattern projected from the light projecting part 12 changes in size and position (expansion and contraction of the spacing between adjacent elements) according to the position and tilt of the object with respect to the optical axis of the light projecting part 12, and it is possible to measure the shape of the object by the principle of triangulation based on such information.

Figure 4:
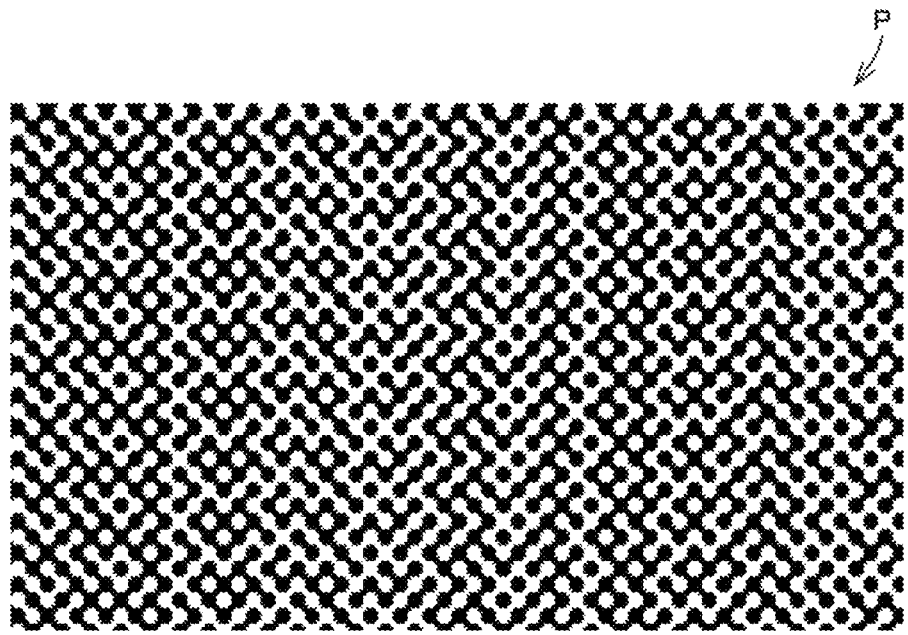
FIG. 4 is a diagram showing an example of the projection pattern projected from the measurement head of the measurement system according to the present embodiment.
Figure 5A:
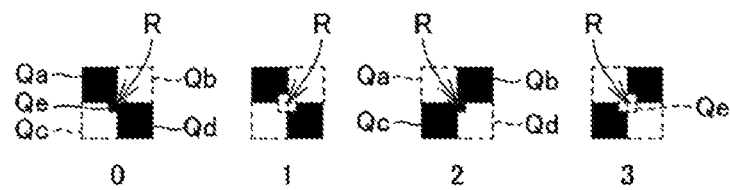
FIG. 5(A) to FIG. 5(C) are diagrams for illustrating the principle of three-dimensional measurement performed by the measurement system according to the present embodiment.
Figure 5B:
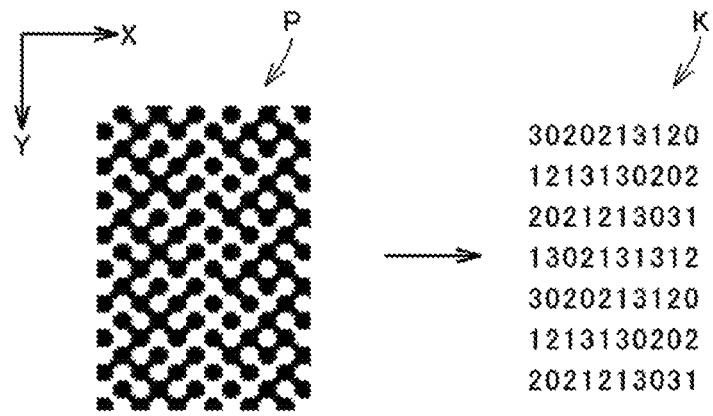
Figure 5C:
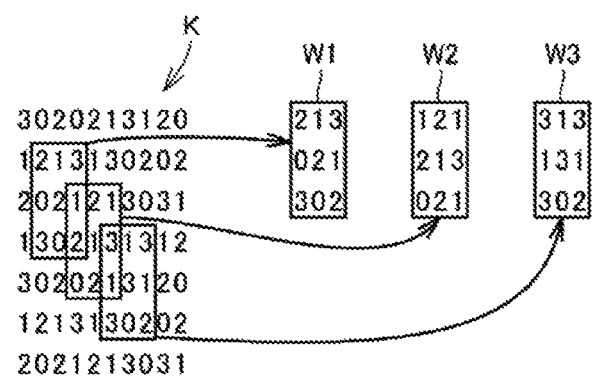

FIG. 4 is a diagram showing an example of the projection pattern projected from the measurement head 10 of the measurement system 1 according to the present embodiment. FIG. 5(A) to FIG. 5(C) are diagrams for illustrating the principle of the three-dimensional measurement performed by the measurement system 1 according to the present embodiment.

For example, the measurement light including the projection pattern P as shown in FIG. 4 is emitted to the object from the light projecting part 12 of the measurement head 10. The imaging part 13 of the measurement head 10 images the object while the projection pattern P is projected thereon.

The projection pattern P shown in FIG. 5(A) to FIG. 5(C) has space codes arranged in a grid (hereinafter also referred to as "grid code"), and unique codes are assigned such that autocorrelation does not occur for a pattern of a predetermined length in a predetermined direction. More specifically, the projection pattern P is defined by a combination of multiple types of primitives (corresponding to reference patterns). Four types of primitives are shown in FIG. 5(A). Each primitive indicates a code (four numerical values, 1 to 4, in the example shown in FIG. 5(A)) assigned thereto.

Each primitive is composed of four large squares Qa to Qd and one small square Qe located in the center. Each of the squares Qa to Qd is arranged so that the primitive position R is a corner. The primitive position R is also the center position of the small square Qe.

As shown in FIG. 5(A), the intersection point (one corner point of the grid) of the large squares Qa to Qd is defined as the primitive position R. Nevertheless, the size and shape of the primitive position R are not limited. Each of the primitives is restored as one of the three-dimensional points.

As shown in FIG. 5(A), when the primitive position R is "white", it is expressed as $p_0=1$; when the primitive position R is "black", it is expressed as $p_0=0$; when the upper left large square Qb of the primitive position R is "white", it is expressed as $p_1=1$; and when the upper left large square Qb of the primitive position R is "black", it is expressed as $p_1=0$. The type of the primitive can be expressed numerically as $2p_1+p_0$.

In FIG. 5(B), the types of the primitives included in a portion of the projection pattern P (see FIG. 4) are expressed by numerical values. That is, a matrix K equivalent to the projection pattern P can be generated by specifying the type of each primitive included in the projection pattern P and expressing the type of each specified primitive as numerical values.

In the following description, the in-plane directions of the projection pattern P are defined as the X direction and the Y direction, and the optical axis direction (height direction) is defined as the Z direction.

FIG. 5(C) shows a partial matrix of the matrix K shown in FIG. 5(B). A partial matrix of a predetermined size (word height $H_{word}$×word width $W_{word}$) set to the matrix K is assumed. Such a partial matrix is also referred to as a "word". That is, each word is defined by a combination of a predetermined number of types of primitives (in the example shown in FIG. 5(C), 3×3). The projection pattern P is generated by arranging the primitives so that each of all the words is unique.

All the words included in the matrix K are extracted from the input image acquired by imaging the object while irradiating the object with the projection pattern P. The process of extracting the primitives and specifying or reconstructing the words is also referred to as "decoding" (of words).

FIG. 5(C) shows three extracted words (words W1, W2, and W3). When all the words are extracted from the pattern shown in the input image, if the sequence of the numerical values of the partial matrix is unique in each extracted word, the position of the word in the pattern is specified. That is, the position (the position of the word) in the projection pattern P can be specified.

When the projection pattern P is projected from the measurement head 10 (light projecting part 12), the position of the word specified from the projected image changes according to the surface shape of the object.

The distance from the measurement head 10 to each part of the object and the three-dimensional shape of the object can be measured based on the size of the word, which is defined from the primitives included in the image acquired by imaging the object while irradiating the object with such a projection pattern P, and the positional deviation between adjacent words.

In the example shown in FIG. 5(C), the adjacent words W1 to W3 share a part of the primitives, for example.

The image measurement device 100 (see FIG. 2) outputs the measurement result of the three-dimensional shape of the object by performing the extraction process of the primitive and the evaluation process of the position and size of the word specified by the extracted primitive for each image outputted from the measurement head 10.

Although FIG. 5(A) shows an example of using four types of primitives, the number of the types of primitives is not limited to four. In addition, the shape and color of the primitive are not limited to those shown in FIG. 5(A), and any shape and color can be used.

Furthermore, it is possible to use pattern matching, which takes each primitive as a model, or a filtering process, which takes the black pixel direction/white pixel direction and the median color as conditions, as a method of detecting the primitives.

For example, a camera of 5M pixels (2500×2000 pixels) is used, and the camera has a field of view of 500 mm×400 mm. Here, it is assumed that one primitive is formed by five pixels and one word is formed by 5×5 (25 in total) primitives.

In this case, the pitch of the primitives is about 1 mm (=500 mm/(2500 pixels/5 pixels)), and the minimum detection width is 5 mm (=1 mm×5 pixels). Since 5×5 pixels are required in order to detect one word, the association between the light projecting part 12 and the imaging part 13 requires an area of 5 mm×5 mm. The spatial resolution (X-Y direction) of the three-dimensional information is a unit of the primitives (1 mm×1 mm in this example).

In the following description, a set of points in the three-dimensional space that has been restored (or to be restored) is also referred to as a "point group". That is, the "point group" means a set of points in the three-dimensional space calculated (or to be calculated) corresponding to each primitive.

D. Problem to be Solved and Solution

Next, a problem to be solved by the measurement system 1 according to the present embodiment and a solution will be described.

Figure 6:
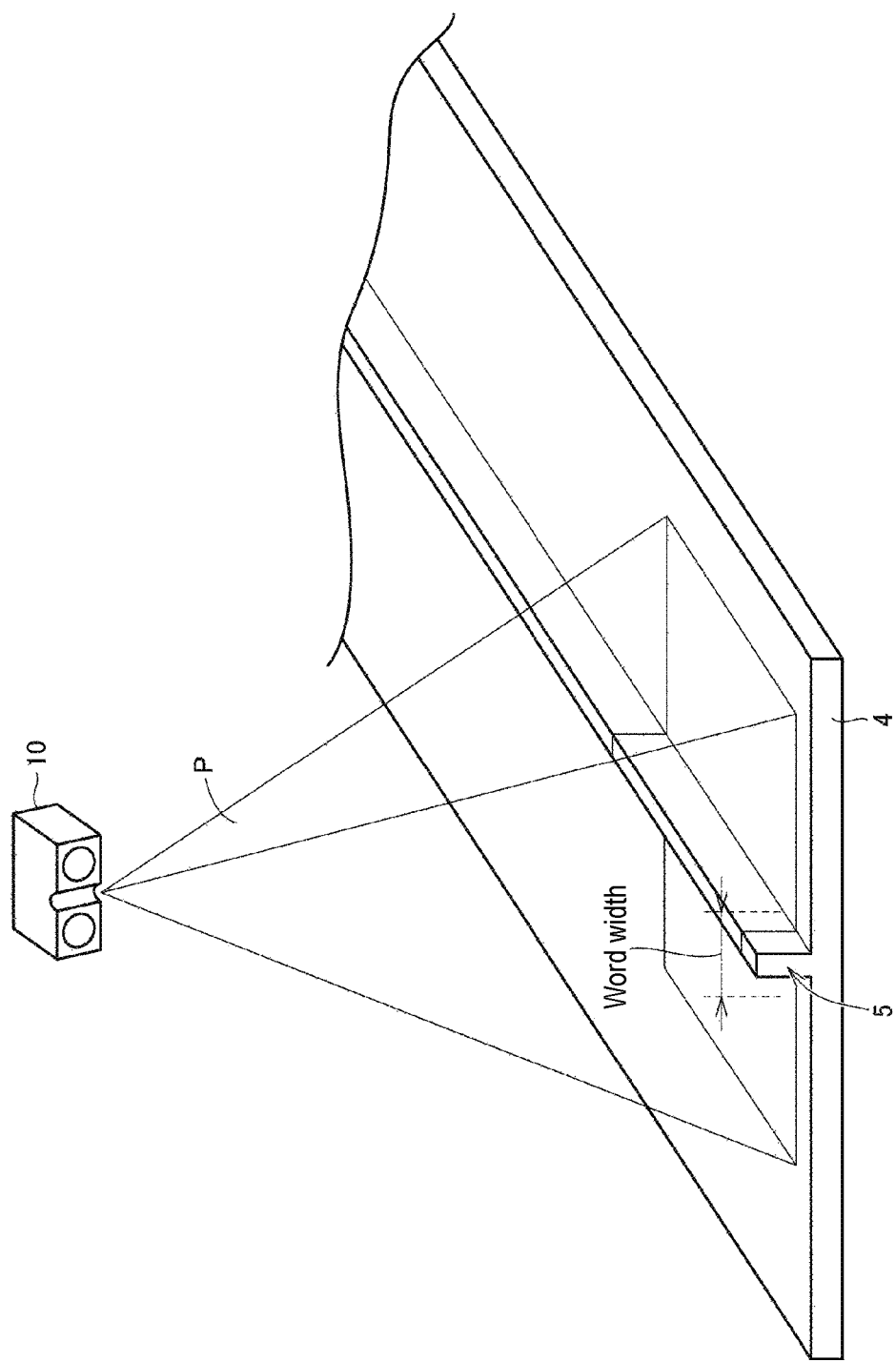
FIG. 6 is a schematic diagram showing an example of the measurement form of the measurement system according to the present embodiment.

FIG. 6 is a schematic diagram showing an example of a measurement form of the measurement system 1 according to the present embodiment. Referring to FIG. 6, it is assumed to be measurement of the three-dimensional shape of a flat workpiece 4. The upper surface of the flat workpiece 4 is formed with a protrusion 5 that has a predetermined width. In the example shown in FIG. 6, it is assumed that the width of the protrusion 5 is narrower than the distance (word width $W_{word}$) required for reconstructing the word as illustrated in FIG. 5(C). That is, there is a gap between the pattern, which is projected to and shown on the exposed surface of the protrusion 5, and the pattern, which is projected to and shown on the exposed surface of the workpiece 4 excluding the protrusion 5, the sizes of the shown primitives are also different.

As a result, the word reconstructed from the detected primitive types does not match any combination of the primitive types, and the position of each word in the pattern cannot be identified. As a result, the shape information of the protrusion 5 cannot be acquired (the height information is defective).

Figure 7:
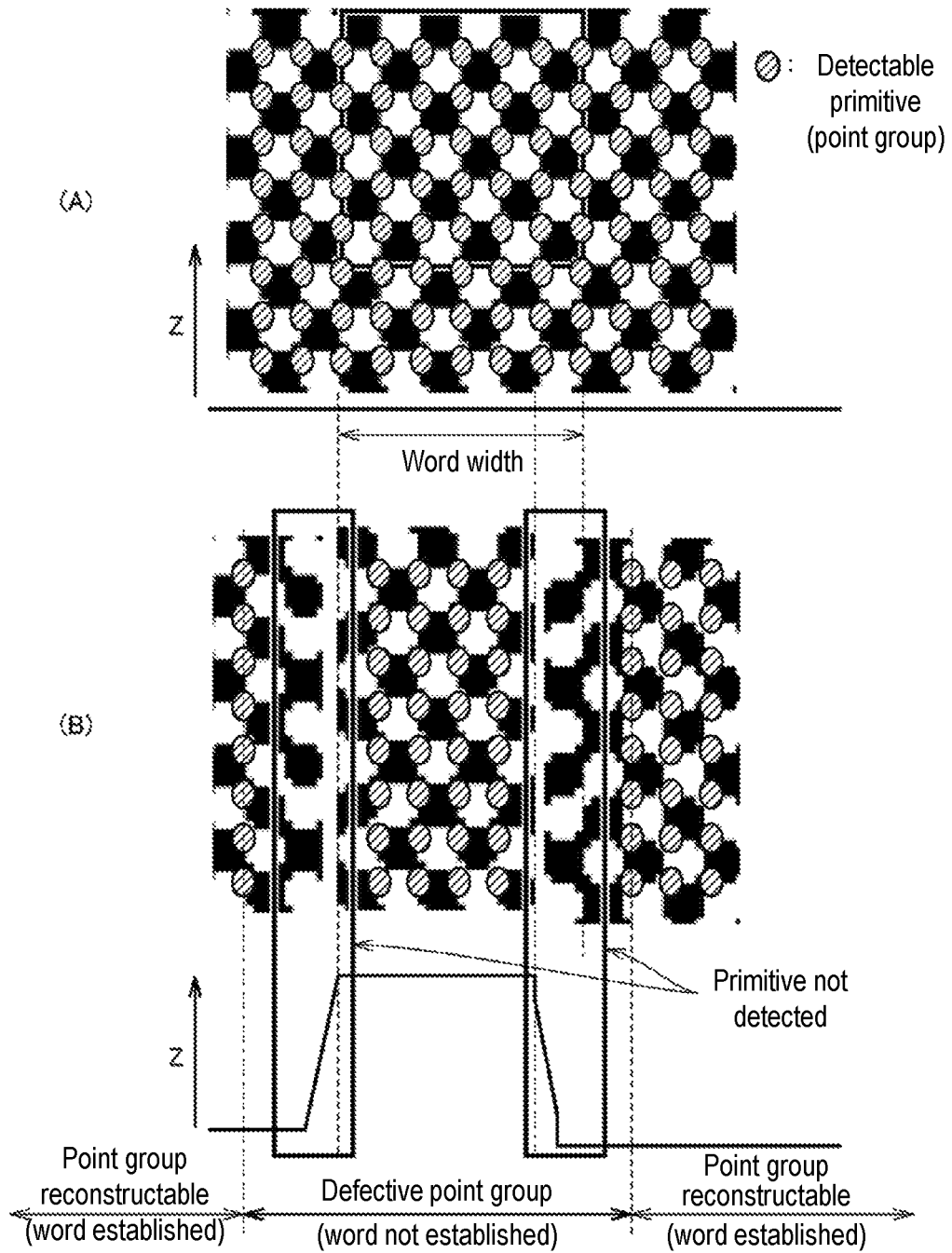
FIG. 7 shows an example of the detection result of the primitive for the input image acquired by imaging the workpiece shown in FIG. 6.

FIG. 7 shows an example of the detection result of the primitive for the input image acquired by imaging the workpiece shown in FIG. 6. (A) of FIG. 7 shows an example of the detection result of the primitive for the input image taking a flat part as the field of view; and (B) of FIG. 7 shows an example of the detection result of the primitive for the input image taking the protrusion as the field of view.

Referring to (A) of FIG. 7, if the measurement surface is flat, it is possible to detect the number of primitives required for reconstructing the word. Since the light projecting part 12 and the imaging part 13 can be associated with each other, the three-dimensional information can be restored for each point.

On the other hand, as shown in (B) of FIG. 7, when there is an uneven portion equal to or smaller than the word width on the measurement surface, and the step is relatively large, detection of the primitive fails due to distortion of the primitive, reduction in contrast, generation of relatively large parallax, etc. caused by the step (the region of "primitive not detected" in (B) of FIG. 7). As a result, the number of primitives required for reconstructing the word is not complete, and therefore the light projecting part 12 and the imaging part 13 cannot be associated with each other, and the three-dimensional information of the point group cannot be restored not only for the region where detection of the primitive fails but also for the surrounding regions (the region of "defective point group" in (B) of FIG. 7). Thus, the code detected for the region where the point group is defective is an incomplete code.

Figure 8:
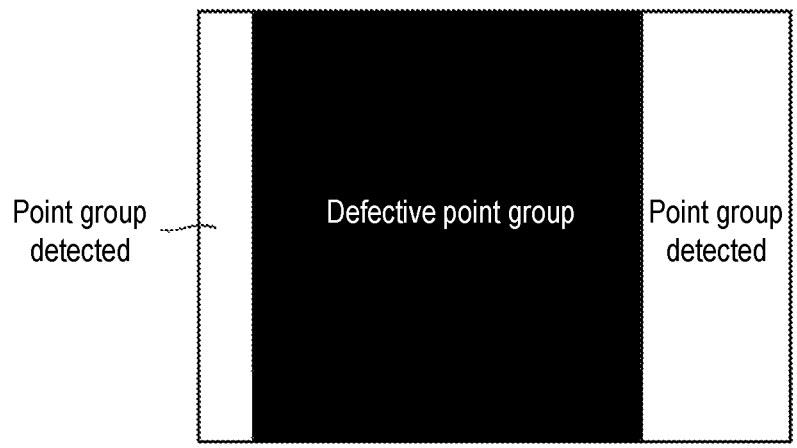
FIG. 8 is a diagram showing an example of the restoration result of the three-dimensional information corresponding to the primitive detection result shown in (B) of FIG. 7.

FIG. 8 is a diagram showing an example of the restoration result of the three-dimensional information corresponding to the primitive detection result shown in (B) of FIG. 7. If the width of the protrusion 5 formed on the flat workpiece 4 is smaller than the width required for reconstructing the word, as shown in FIG. 8, no three-dimensional information of the point group (the region of defective point group) is present around the protrusion 5.

Figure 9:
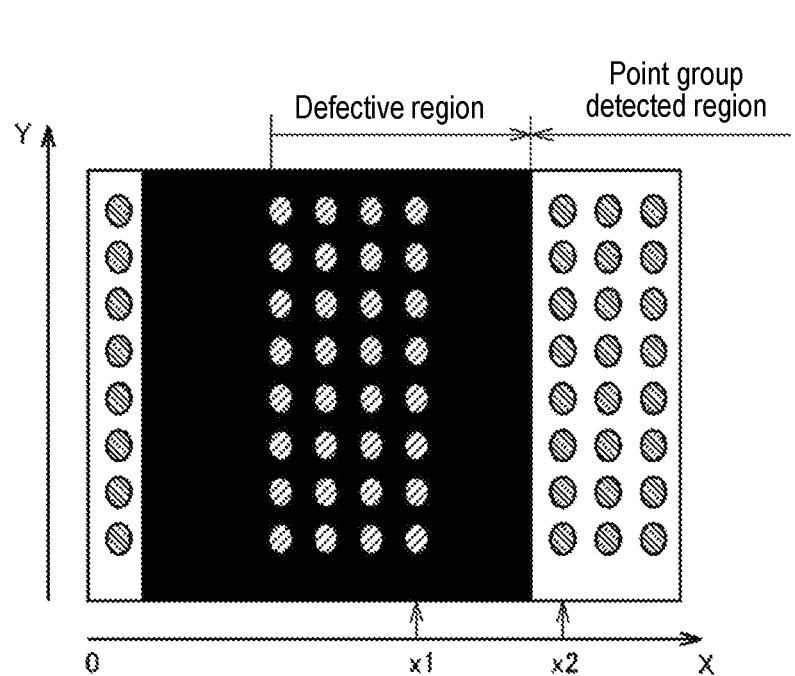
FIG. 9 is a diagram for illustrating a process of estimating three-dimensional information for the restoration result of the three-dimensional information shown in FIG. 8.

FIG. 9 is a diagram for illustrating a process of estimating the three-dimensional information for the restoration result of the three-dimensional information shown in FIG. 8. In the example shown in FIG. 9, with respect to the region where the point group is defective, primitives sufficient for reconstructing the word cannot be detected, but in fact four primitives have been successfully detected. The measurement system 1 according to the present embodiment remedies the primitives detected in the region where the point group is defective by using the information of the primitives nearby, so as to estimate the three-dimensional information of the point group.

That is, the measurement system 1 according to the present embodiment provides a process of estimating three-dimensional information for such a portion (defective point group region) that has a change width smaller than the size of a single word included in the projection pattern P.

In FIG. 9, X1 indicates the boundary on the right side of the defective point group region on the input image where the primitive can be detected, and X2 indicates the boundary on the left side of the region (the region where the word has been reconstructed) where the three-dimensional information of the point group on the input image has been restored.

Figure 10:
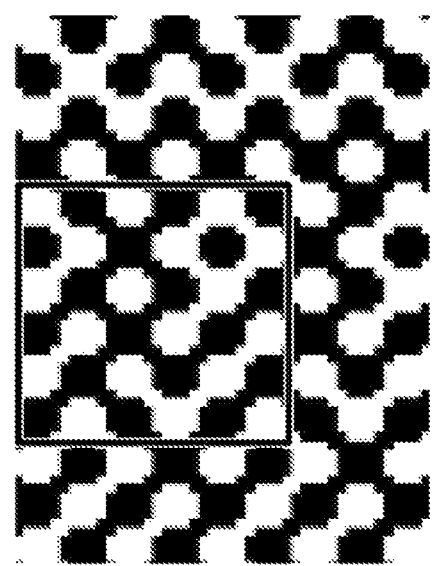
FIG. 10 is a diagram schematic illustrating a process of peripheral search of the measurement system according to the present embodiment.

FIG. 10 is a schematic diagram illustrating a process of peripheral search of the measurement system 1 according to the present embodiment. FIG. 10 shows an example of the result of coding each primitive detected from the projected pattern. That is, it shows an example of expressing the type of each detected primitive with the corresponding code.

In mere peripheral search, a word is restored by detecting the adjacent primitives on the upper, lower, left, and right sides based on any primitive of interest. If the range of the peripheral search is broadened, the decoding process takes time. In addition, if the adjacent primitives are defective, the word cannot be restored by the peripheral search. Thus, by applying the process of estimating the three-dimensional information provided by the measurement system 1 according to the present embodiment, the decoding process can be properly performed even if the adjacent primitives are defective.

E. Estimating Process

Next, the processing procedure of the process of estimating the three-dimensional information performed by the measurement system 1 according to the present embodiment (hereinafter may be simply referred to as "estimating process") will be described.

Figures 11A, 11B:
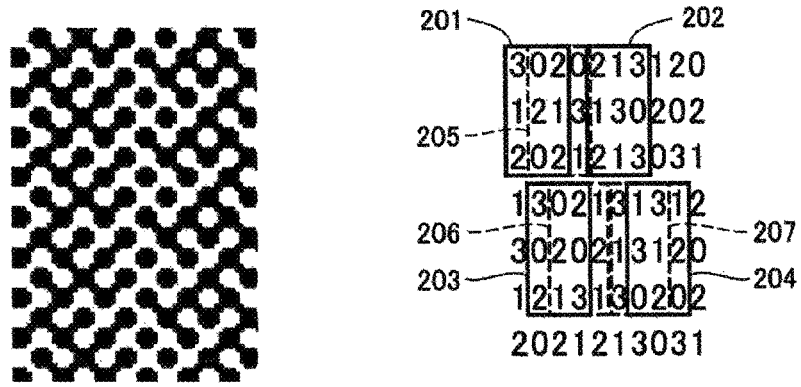

FIG. 11(A) and FIG. 11(B) are diagrams showing an example of the projection pattern used in the measurement system 1 according to the present embodiment. In the following description, as an example, it is assumed that a projection pattern P as shown in FIG. 11(A) is projected. As shown in FIG. 11(B), a code string of codes (one of the values of 0 to 3 as an example) indicated by the primitives corresponding to the projection pattern P in FIG. 11(A) is shown. Any word set in the code string shown in FIG. 11(B) is also referred to as a "model word".

Here, it is assumed that the optical axes of the light projecting part 12 and the imaging part 13 are parallel and they are parallel to the X axis. Also, it is assumed that the size of the word constituted by a plurality of primitives is 3×3.

In the process of reconstructing a word (a recognition algorithm of grid code pattern), the primitive detection process is first performed for the entire input image, and then the word is reconstructed by associating the nearby primitives with each other.

Figure 12:
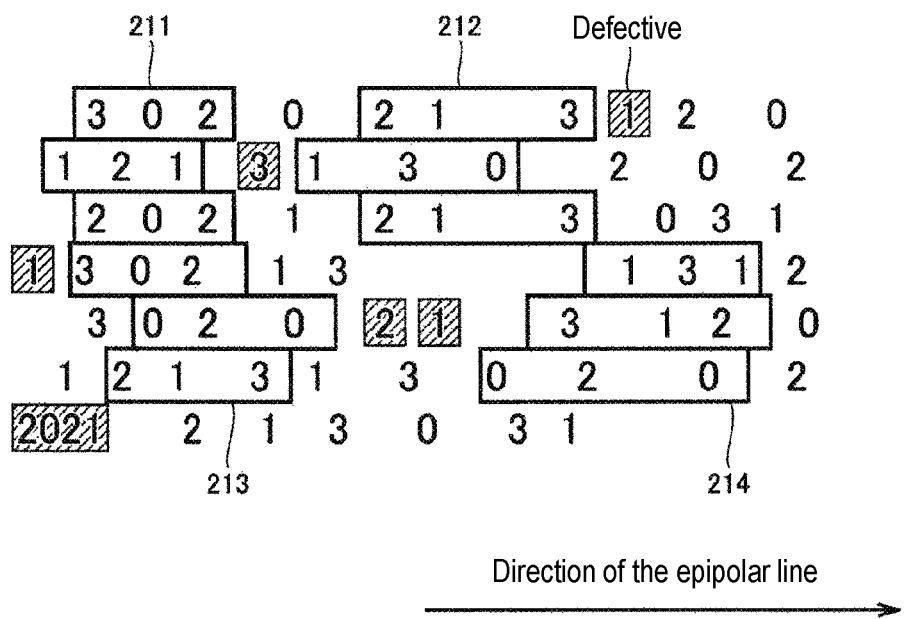
FIG. 12 is a diagram showing an example of the decoding result obtained from the primitive detected from the input image in the measurement system according to the present embodiment.

FIG. 12 is a diagram showing an example of the decoding result obtained from the primitive detected from the input image in the measurement system 1 according to the present embodiment.

If the exposed surface of the object is a flat surface perpendicular to the optical axes of the light projecting part 12 and the imaging part 13, the pattern shown in the input image acquired by the imaging part 13 is a pattern having no distortion as shown in FIG. 11(A). On the other hand, if an uneven portion is present on the exposed surface of the object, as shown in FIG. 12, the position of the detected primitive deviates in the direction of the epipolar line. Furthermore, optical factors such as shielding and crushing may cause undetectable primitives (defective primitives; the hatched numbers shown in FIG. 12).

Figure 13:
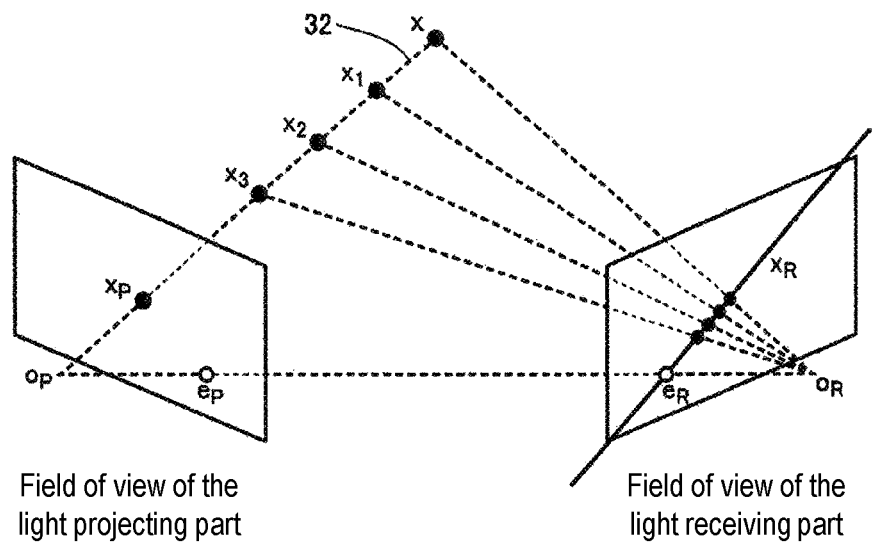
FIG. 13 is a diagram for illustrating the epipolar line in the measurement system according to the present embodiment.

FIG. 13 is a diagram for illustrating the epipolar line in the measurement system 1 according to the present embodiment. Referring to FIG. 13, in the region where the field of view of the light projecting part 12 and the field of view of the imaging part 13 overlap each other, when the object changes in the depth direction, the line on which the intersection point of the two optical axes changes corresponds to the epipolar line 32. Deviating the pattern along the epipolar line 32 means changing the distance from the projection plane of the light projecting part 12.

In the following description, a specific procedure of associating the model code string shown in FIG. 11(B) with the detected code string shown in FIG. 12 (hereinafter also referred to as "measurement code string") will be described.

1: Search for Code String

First, by searching the input image for each primitive (corresponding to the reference pattern) included in the projected projection pattern P, the image measurement device 100 acquires the position to which each primitive is projected and a measurement code string which is a set of codes indicated by the projected primitive.

Then, the image measurement device 100 searches the measurement code string (a set of codes) for a grid code pattern (corresponding to the corresponding region) which indicates the same sequence as the model code string composed of a predetermined number of codes included in a word (corresponding to the unit region) set in the projection pattern P.

At this time, since each primitive (reference pattern) included in the projected projection pattern P deviates along the epipolar line, it is preferable to search for the grid code pattern along the epipolar line of the input image.

More specifically, the code "302" in the first line of the model word 201 included in the model code string shown in FIG. 11(B) is searched from the code string in the first line of the measurement code string shown in FIG. 12. Similarly, the code "121" in the second line of the model word 201 is searched from the code string in the second line of the measurement code string shown in FIG. 12, and the code "202" in the third line of the model word 201 is searched from the code string in the third line of the measurement code string shown in FIG. 12. With respect to the model word 201, since the search for the code in each line is successful, recognition of the grid code pattern 211 can be determined.

Next, the image measurement device 100 moves on to the word on the right in the model code string shown in FIG. 11(B), and an attempt is made to search for the code in each line as for the model word 201. However, in this example, it cannot be detected because "3" is defective.

Therefore, the image measurement device 100 further moves on to the model word on the right, sets the model word 202, and tries to reconstruct the word. Since it can find the code string in each line of "213", "130", and "213", recognition of the grid code pattern 212 can be determined.

As the model code strings are sequentially set from the left end to the right end for the code strings shown in FIG. 11(B), the series of operations related to word reconstruction as described above are repeated. When the model code string reaches the right end, the setting of the model code string for that line is finished, and the image measurement device 100 moves down by the word height (three lines in the example shown in FIG. 12) to sequentially set the model code strings from the left end to the right end again and repeat the series of operations related to word reconstruction. Then, recognition of the grid code pattern 213 and the grid code pattern 214 can be determined.

With the above operations, the key grid code pattern has been determined, so next the undetermined grid code pattern that is present between the determined grid code patterns in the same line is determined. Here, the image measurement device 100 searches the measurement code string again for the model code string that failed in the search for the grid code pattern (corresponding region), among the model code strings included in the projection pattern P, under a condition that allows mismatch of a predetermined number of codes.

In this second search, the image measurement device 100 searches the measurement code string (a set of codes) for a code that matches each code included in the model code string, and then determines recognition of the model code string when the number of codes that fail to be searched in this search is equal to or smaller than a predetermined number.

Figure 14:
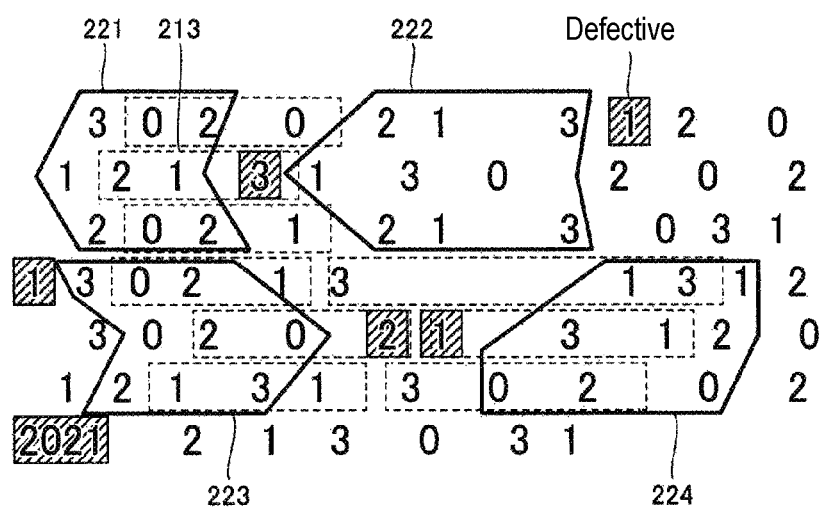
FIG. 14 is a diagram showing an example of the final decoding result obtained from the primitive detected from the input image in the measurement system according to the present embodiment.

In the example shown in FIG. 14, if the measurement code string is searched for the model word 205 ("020", "213", and "021") that is present to the right of the model word 201 by allowing the number of mismatches to be "1", "020", "21X", and "021" can be detected respectively. However, X indicates that the codes do not match (that is, it fails to be detected). In the example shown in FIG. 14, originally "3" has to be present, but the "3" is defective.

Similarly, if the measurement code string is searched for the model word 206 ("021", "202", and "131") that is between the model word 203 and the model word 204 by allowing the number of mismatches to be "1", "021", "20X", and "131" can be detected respectively. In addition, if the measurement code string is searched for the model word 207 ("313", "131", and "302") that is between the model word 203 and the model word 204 with the allowable number of mismatches set to "1", "313", "X31", and "302" can be detected respectively.

FIG. 14 is a diagram showing an example of the final decoding result of the primitive detected from the input image in the measurement system 1 according to the present embodiment. With the above operations, as shown in FIG. 14, not only the regions enclosed by the grid code pattern 221 to the grid code pattern 224, all the primitives are associated with the model words except for the defective primitives.

2: Distance Estimation Based on Grid Code Pattern Method

With the above operations, the distance is estimated based on the position information of the primitive associated with the model word. That is, the image measurement device 100 calculates the distance from the irradiation reference plane of the projection pattern P to each part of the object based on the position of the model word composed of the model code string and the positional relationship of the word projected on the reference plane, which has been searched in the previous search process.

For example, the image measurement device 100 may calculate the respective centroid positions while shifting by one word to the left, right, upper, and lower sides on the input image in the unit of 3×3 which corresponds to the size of the grid code pattern, and calculate the distance from the measurement head 10 based on the respectively calculated centroid positions.

Furthermore, the image measurement device 100 may calculate the distance in the unit of primitives instead of calculating the distance in the unit of words as described above. In that case, it is possible to obtain a waveform of distance data that is spatially dense (XY direction).

3: Application Example/Modified Example

The above search method may be applied to all regions of the model code string. However, it may also be applied to a partial region that fails to be associated after association of the grid code pattern is performed by peripheral search as disclosed in Patent Document 1, for example. By performing such stepwise association, it is possible to reduce the risk of erroneous association as well as increase the number of associations that can be achieved.

In the above search method, no restriction condition is set for the range of presence of the object in the depth direction, that is, the value of the generated parallax. However, a predetermined restriction condition may be set. Since the search range of the primitive code is limited by setting such a restriction condition in the depth direction, it is possible to reduce the calculation time as well as reduce the risk of erroneous association.

The example shows that the above search method sequentially sets the model words from the upper left of the model code string. According to this setting method, there may be primitives that cannot be associated at the lower end or right end of the model code string. In such a case, the model words may be sequentially set from the upper left of the model code string and also from the upper right of the model code string instead of being sequentially set from the upper left of the model code string. That is, by setting a plurality of scanning directions for sequentially setting the model words and using them in combination, it is possible to increase the number of associations of the primitives.

In addition, in the above search method, in determining the undetermined grid code patterns, other grid code patterns are determined (interpolated) to fill in the gaps with the grid code patterns already determined in the measurement code string as key points. However, the disclosure is not limited thereto. For example, if the grid code pattern determined by the peripheral search as disclosed in Patent Document 1 is present outside the measurement code string, the interpolation process may be performed with such a grid code pattern that is present outside. By expanding the range of such an interpolation process, for example, it is possible to associate the three points "312" that are located on the left side of the grid code pattern 223 and cannot be associated in FIG. 14.

In the above description, a 3×3 grid code pattern is used as an example. However, the size of the grid code pattern may be designed as desired, and for example, a 5×5 grid code pattern may also be used.

F. Functional Configuration

Next, a functional configuration for realizing the process of estimating the three-dimensional information provided by the measurement system 1 according to the present embodiment will be described.

Figure 15:
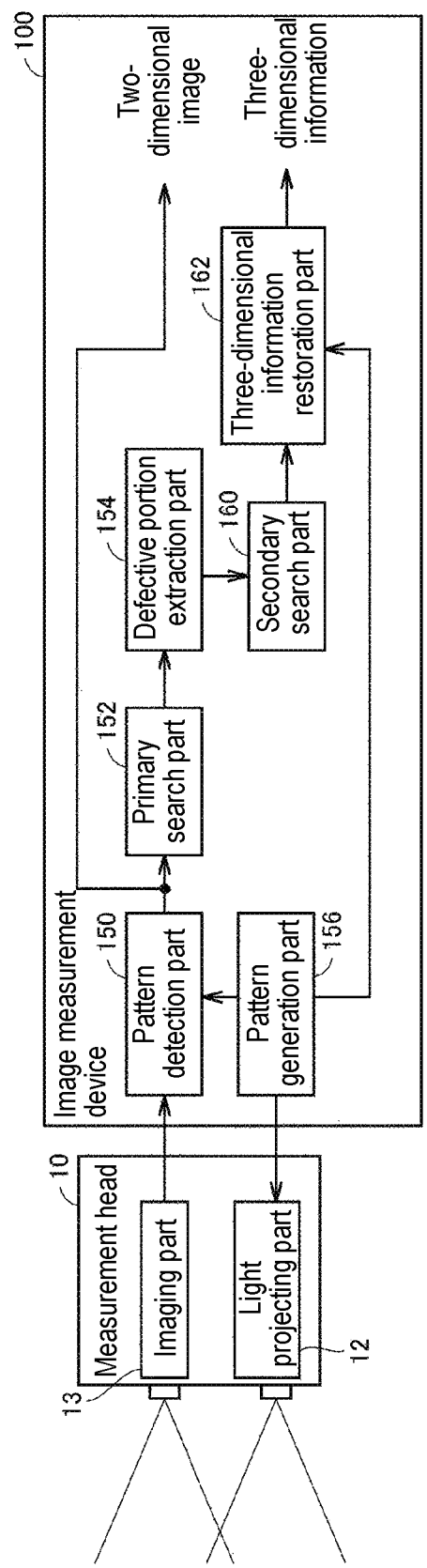
FIG. 15 is a schematic diagram showing an example of the functional configuration for realizing the process of estimating three-dimensional information provided by the measurement system according to the present embodiment.

FIG. 15 is a schematic diagram showing an example of the functional configuration for realizing the process of estimating the three-dimensional information provided by the measurement system 1 according to the present embodiment. Each function shown in FIG. 15 is typically realized by execution of the three-dimensional measurement program 1062 performed by the processor 102 of the image measurement device 100.

Referring to FIG. 15, the image measurement device 100 is connected to the measurement head 10 and outputs three-dimensional information and a two-dimensional image (substantially the same as the input image) based on the input image acquired by imaging the object while irradiating the object with the projection pattern P. More specifically, the image measurement device 100 includes a pattern detection part 150, a primary search part 152, a defective portion extraction part 154, a pattern generation part 156, a secondary search part 160, and a three-dimensional information restoration part 162.

The pattern generation part 156 generates a predetermined projection pattern P and outputs it to the light projecting part 12 and the pattern detection part 150. The light projecting part 12 irradiates the object with the projection pattern P instructed by the pattern generation part 156.

The pattern detection part 150 generates the position to which each primitive is projected and a set of codes indicated by the projected primitive by searching the input image for each primitive (reference pattern) included in the projected projection pattern P. More specifically, the pattern detection part 150 receives the input image that the imaging part 13 generates by imaging the object, and detects the primitives from the gradation pattern shown in the input image.

The primary search part 152 searches the set of codes for a corresponding region that indicates the same sequence as a model code string composed of a predetermined number of codes included in a unit region set in the projection pattern P. That is, the primary search part 152 acquires the set of codes generated by the pattern detection part 150, and searches the set of codes for a grid code pattern (corresponding to the corresponding region) that indicates the same sequence as that of the codes indicated by a predetermined number of primitives included in a word (corresponding to the unit region) which is set in the projection pattern P. The primary search part 152 outputs the positions of the detected primitive and word to the defective portion extraction part 154.

The defective portion extraction part 154 specifies the region where the word cannot be reconstructed (the portion where the height information is defective) based on the information of the positions of the primitive and the word detected by the primary search part 152. The information of the defective portion is outputted to the secondary search part 160.

The secondary search part 160 tries to search for the corresponding primitive and reconstruct the word for the portion corresponding to the defective portion of the input image or the periphery of the corresponding portion. Specifically, the secondary search part 160 searches the set of codes for a code that matches each code included in a model code string, which fails in the search for the grid code pattern (corresponding to the corresponding region) among the model code strings included in the projection pattern P, and then determines recognition of the model code string when the number of codes that fail to be searched in this search is equal to or smaller than a predetermined number. The search result of the secondary search part 160 is outputted to the three-dimensional information restoration part 162.

The three-dimensional information restoration part 162 corresponds to a distance calculation part and calculates the distance from the irradiation reference plane of the projection pattern P (the irradiation surface of the light projecting part 12) to each part of the object based on the corresponding relationship between the model code string and the corresponding region searched by the primary search part 152 and the secondary search part 160. More specifically, the three-dimensional information restoration part 162 restores three-dimensional information in the field of view corresponding to the input image based on the positions of the primitive and the word detected.

Although not shown in FIG. 15, various application processes such as control of a robot may be performed based on the three-dimensional information outputted from the three-dimensional information restoration part 162.

G. Processing Procedure

Next, a processing procedure for realizing the process of estimating the three-dimensional information provided by the measurement system 1 according to the present embodiment will be described.

Figure 16:
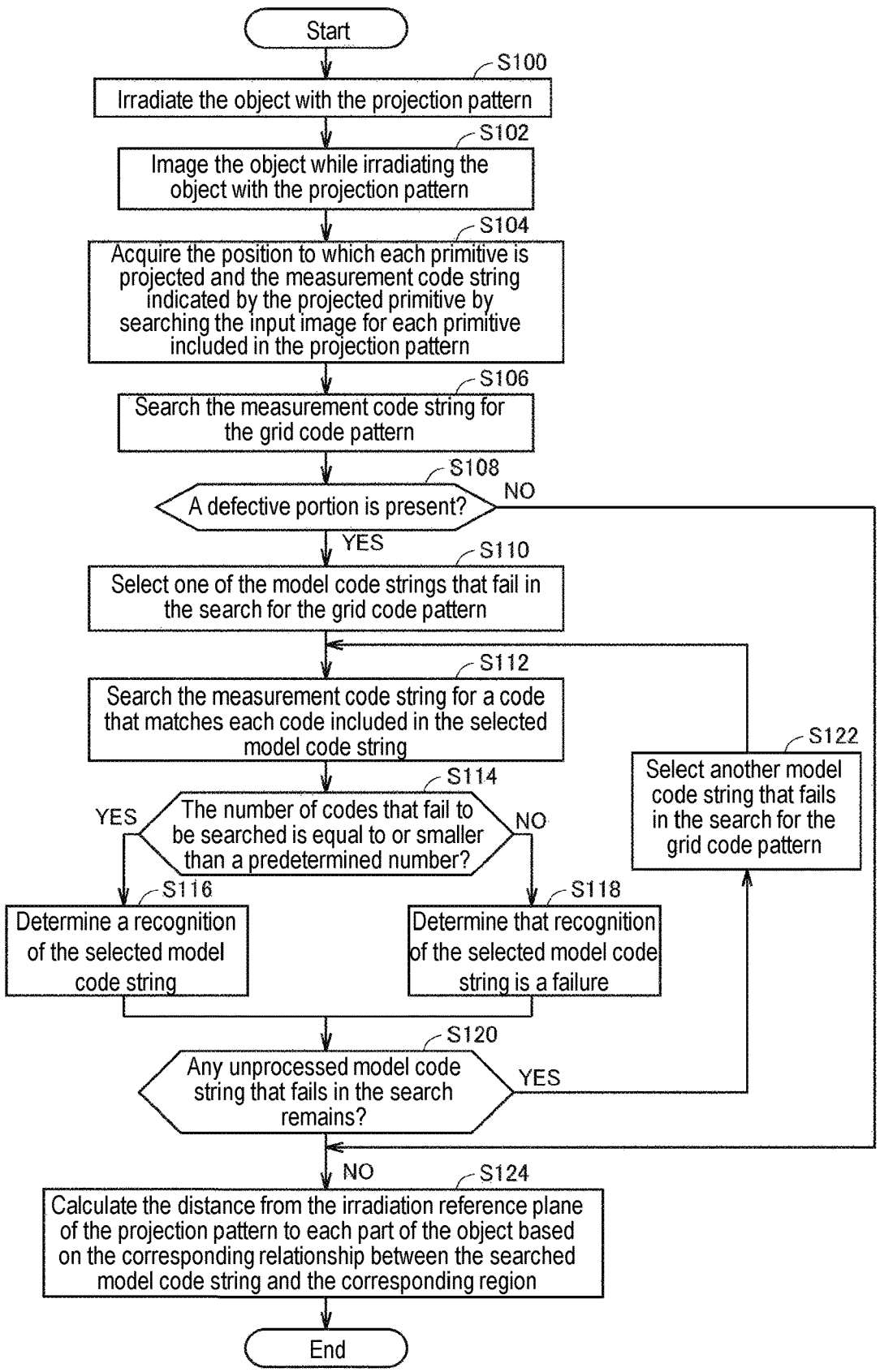
FIG. 16 is a flowchart showing a processing procedure of estimating three-dimensional information provided by the measurement system according to the present embodiment.

FIG. 16 is a flowchart showing the processing procedure of estimating the three-dimensional information provided by the measurement system 1 according to the present embodiment. Each step shown in FIG. 16 is typically realized by execution of the three-dimensional measurement program 1062 performed by the processor 102 of the image measurement device 100.

Referring to FIG. 16, the image measurement device 100 irradiates the object with the projection pattern P (Step S100) and images the object while irradiating the object with the projection pattern P (Step S102).

Subsequently, the image measurement device 100 acquires the position to which each primitive is projected and the measurement code string (corresponding to the set of codes) indicated by the projected primitive by searching the input image acquired in Step S102 for each primitive (corresponding to the reference pattern) included in the projected projection pattern P (Step S104). That is, the image measurement device 100 searches for the primitive included in the input image to generate the measurement code string.

Next, the image measurement device 100 searches the measurement code string (the set of codes) for a grid code pattern (corresponding to the corresponding region) that indicates the same sequence as a model code string composed of a predetermined number of codes included in a word (corresponding to the unit region) set in the projection pattern P (Step S106). That is, the image measurement device 100 searches the input image for a word the same as the word (combination of multiple primitives) that will be included in the projection pattern P.

Then, the image measurement device 100 determines whether a defective portion is present based on the number and positions of the words searched from the input image (Step S108). If no defective portion is present (NO in Step S108), the process proceeds to Step S122.

If a defective portion is present (YES in Step S108), the image measurement device 100 searches the measurement code string for a code that matches each code included in a model code string, which fails in the search for the grid code pattern among the model code strings included in the projection pattern P, and then determines recognition of the model code string when the number of codes that fail to be searched in this search is equal to or smaller than a predetermined number.

Specifically, the image measurement device 100 selects one of the model code strings that fail in the search for the grid code pattern (Step S110). Then, the image measurement device 100 searches the measurement code string for a code that matches each code included in the selected model code string (Step S112). The image measurement device 100 determines whether the number of codes that fail to be searched in the search of Step S112 is equal to or smaller than a predetermined number (Step S114).

If the number of codes that fail to be searched is equal to or smaller than a predetermined number (YES in Step S114), the image measurement device 100 determines recognition of the selected model code string (Step S116). Then, the process proceeds to Step S120.

On the contrary, if the number of codes that fail to be searched exceeds the predetermined number (NO in Step S114), the image measurement device 100 determines that recognition of the selected model code string is a failure (Step S118). Then, the process proceeds to Step S120.

In Step S120, the image measurement device 100 determines whether any unprocessed model code string that fails in the search for the grid code pattern remains (Step S120). If there is an unprocessed model code string that fails in the search for the grid code pattern (YES in Step S120), the image measurement device 100 selects another model code string that fails in the search for the grid code pattern (Step S122), and repeats the process from Step S112. That is, the search process is repeated for all the model code strings that fail in the search for the grid code pattern (corresponding region).

If there is no unprocessed model code string that fails in the search for the grid code pattern (NO in Step S120), the image measurement device 100 calculates the distance from the irradiation reference plane of the projection pattern P to each part of the object based on the corresponding relationship between the searched model code string and the corresponding region (Step S124). That is, the image measurement device 100 constructs the three-dimensional information of the object based on the position of the grid code pattern searched. Then, the process ends.

H. Modified Example

The above embodiment illustrates a processing example of using a single condition that allows mismatch of a predetermined number of codes. However, the condition that allows mismatch may be changed dynamically. In that case, the search process may be repeated by sequentially relaxing the allowable number of mismatches with respect to the measurement code string.

For example, the three-dimensional information may be restored by setting the allowable number of mismatches with respect to the measurement code string to "10%" of the number of primitives included in the word. If the allowable number of mismatches set this time increases the number of unrecognized codes and makes it difficult to restore the three-dimensional information, the allowable number of mismatches is increased to "20%" for that portion to try to restore the three-dimensional information again.

In this manner, the processing may be repeated by gradually increasing the allowable number of mismatches or the allowable rate until restoration of the three-dimensional information is successful. That is, the image measurement device 100 may repeat the search for a code that matches each code included in the model code string that fails in the search for the corresponding region by varying the predetermined number, which is the allowable number of mismatches with respect to the measurement code string.

Compared with the method of relaxing the allowable number of mismatches or the allowable rate from the beginning, the disclosure makes it possible to reduce the possibility of an erroneous association as well as increase the success rate of restoration of the three-dimensional information.

I. Appendix

The present embodiment as described above includes the following technical ideas.

Configuration 1

A measurement system, including an acquisition part (10) acquiring an input image that is an image acquired by imaging an object while irradiating the object with a predetermined projection pattern (P), wherein the projection pattern includes a plurality of types of reference patterns, each of which is assigned with a unique code, arranged according to a predetermined rule, the measurement system including:

a detection part (150) acquiring a position to which each reference pattern is projected and a set of codes indicated by the projected reference pattern by searching the input image for each reference pattern included in the projected projection pattern;

a first search part (152) searching the set of codes for a corresponding region that indicates the same sequence as a model code string composed of a predetermined number of codes included in a unit region set in the projection pattern;

a second search part (160) searching the set of codes for a code that matches each code included in a model code string, which fails in the search for the corresponding region among the model code strings included in the projection pattern, and then determining recognition of the model code string when the number of the codes that fail to be searched in this search is equal to or smaller than a predetermined number; and a distance calculation part (162) calculating a distance from an irradiation reference plane of the projection pattern to each part of the object based on a corresponding relationship between the model code string and the corresponding region searched by the first search part and the second search part.

Configuration 2

The measurement system according to configuration 1, wherein the first search part and the second search part search along an epipolar line (32) of the input image.

Configuration 3

The measurement system according to configuration 1 or 2, wherein the second search part repeats a search process for all model code strings that fail in the search for the corresponding region.

Configuration 4

The measurement system according to any one of configurations 1 to 3, wherein the second search part repeats searching for a code that matches each code included in the model code string that fails in the search for the corresponding region by varying the predetermined number.

Configuration 5

A measurement method, including acquiring an input image that is an image acquired by imaging an object while irradiating the object with a predetermined projection pattern (P) (S100, S102), wherein the projection pattern includes a plurality of types of reference patterns, each of which is assigned with a unique code, arranged according to a predetermined rule, the measurement method including:

acquire a position to which each reference pattern is projected and a set of codes indicated by the projected reference pattern by searching the input image for each reference pattern included in the projected projection pattern (S104);

searching the set of codes for a corresponding region that indicates the same sequence as a model code string composed of a predetermined number of codes included in a unit region set in the projection pattern (S106);

searching the set of codes for a code that matches each code included in a model code string, which fails in the search for the corresponding region among the model code strings included in the projection pattern, and then determining recognition of the model code string when the number of the codes that fail to be searched in this search is equal to or smaller than a predetermined number (S110, S112, S114, S116, S122); and calculating a distance from an irradiation reference plane of the projection pattern to each part of the object based on a corresponding relationship between the model code string and the corresponding region searched (S124).

Configuration 6

The measurement method according to configuration 5, wherein the reference pattern is searched along an epipolar line (32) of the input image.

Configuration 7

The measurement method according to configuration 5 or 6, wherein a search process is repeated for all model code strings that fail in the search for the corresponding region (S120, S122).

Configuration 8

The measurement method according to any one of configurations 5 to 7, further including repeating searching for a code that matches each code included in the model code string that fails in the search for the corresponding region by varying the predetermined number.

J. Advantages

Since the image measurement system according to the present embodiment strictly determines the corresponding relationship between the model code and the corresponding region and then searches the corresponding region with respect to the model code, for which the corresponding relationship cannot be determined, under a relaxed condition that allows mismatch of a predetermined number of codes, it is possible to properly calculate the distance to the object even if the input image includes noise for some reason.

It should be understood that the embodiments disclosed herein are illustrative and non-restrictive in every respect. The scope of the disclosure is defined not by the description above but by the claims, and is intended to include all modifications within the meaning and scope equivalent to the claims.

What is claimed is:

1. A measurement system, comprising an acquisition part acquiring an input image that is an image acquired by imaging an object while irradiating the object with a projection pattern determined in advance, wherein the projection pattern comprises a plurality of types of reference patterns, each of which is assigned with a unique code, arranged according to a predetermined rule, the measurement system comprising:

a detection part acquiring a position to which each reference pattern is irradiated and a set of codes indicated by the irradiated reference pattern by searching each reference pattern included in the irradiated projection pattern in the input image;

a first search part searching the set of codes for a corresponding region that indicates the same sequence as a model code string composed of a predetermined number of codes included in a unit region set in the projection pattern;

a second search part searching the set of codes for a code that matches each code included in a model code string, which fails in the search for the corresponding region among the model code strings included in the projection pattern, and then determining a recognition of the model code string when a number of the codes that fail to be searched in the search is equal to or smaller than a predetermined number; and a distance calculation part calculating a distance from an irradiation reference plane of the projection pattern to each part of the object based on a corresponding relationship between the model code string and the corresponding region searched by the first search part and the second search part.

2. The measurement system according to claim 1, wherein the first search part and the second search part search along an epipolar line of the input image.

3. The measurement system according to claim 2, wherein the second search part repeats a search process for all model code strings that fail in the search for the corresponding region.

4. The measurement system according to claim 3, wherein the second search part repeats searching for a code that matches each code included in the model code string that fails in the search for the corresponding region by varying the predetermined number.

5. The measurement system according to claim 2, wherein the second search part repeats searching for a code that matches each code included in the model code string that fails in the search for the corresponding region by varying the predetermined number.

6. The measurement system according to claim 1, wherein the second search part repeats a search process for all model code strings that fail in the search for the corresponding region.

7. The measurement system according to claim 6, wherein the second search part repeats searching for a code that matches each code included in the model code string that fails in the search for the corresponding region by varying the predetermined number.

8. The measurement system according to claim 1, wherein the second search part repeats searching for a code that matches each code included in the model code string that fails in the search for the corresponding region by varying the predetermined number.

9. A measurement method, comprising acquiring an input image that is an image acquired by imaging an object while irradiating the object with a projection pattern determined in advance, wherein the projection pattern comprises a plurality of types of reference patterns, each of which is assigned with a unique code, arranged according to a predetermined rule, the measurement method comprising:

acquiring a position to which each reference pattern is irradiated and a set of codes indicated by the irradiated reference pattern by searching each reference pattern included in the irradiated projection pattern in the input image;

searching the set of codes for a corresponding region that indicates the same sequence as a model code string composed of a predetermined number of codes included in a unit region set in the projection pattern;

searching the set of codes for a code that matches each code included in a model code string, which fails in the search for the corresponding region among the model code strings included in the projection pattern, and then determining a recognition of the model code string when a number of the codes that fail to be searched in the search is equal to or smaller than a predetermined number; and calculating a distance from an irradiation reference plane of the projection pattern to each part of the object based on a corresponding relationship between the model code string and the corresponding region that are searched.

10. The measurement method according to claim 9, wherein the reference pattern is searched along an epipolar line of the input image.

11. The measurement method according to claim 10, wherein a search process is repeated for all model code strings that fail in the search for the corresponding region.

12. The measurement method according to claim 11, further comprising repeating searching for a code that matches each code included in the model code string that fails in the search for the corresponding region by varying the predetermined number.

13. The measurement method according to claim 10, further comprising repeating searching for a code that matches each code included in the model code string that fails in the search for the corresponding region by varying the predetermined number.

14. The measurement method according to claim 9, wherein a search process is repeated for all model code strings that fail in the search for the corresponding region.

15. The measurement method according to claim 14, further comprising repeating searching for a code that matches each code included in the model code string that fails in the search for the corresponding region by varying the predetermined number.

16. The measurement method according to claim 9, further comprising repeating searching for a code that matches each code included in the model code string that fails in the search for the corresponding region by varying the predetermined number.

* * * * *